United States Patent [19]

Stemmler, Jr. et al.

[11] Patent Number: 5,989,611
[45] Date of Patent: *Nov. 23, 1999

[54] AGENT FOR INCREASING THE KEEPING QUALITY OF SLAUGHTERED-ANIMAL CARCASSES

[76] Inventors: Heinz Stemmler, Jr., Konrad-Adenauer-Ufer 35, Cologne, Germany, 50668; Andreas Stolle, Donauschwabenstrabe 18, Eching, Germany, 85386; Hans G. Liebich, Germaniastrabe 5, Munich, Germany, 80802

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,365
[22] PCT Filed: Mar. 30, 1995
[86] PCT No.: PCT/EP95/01180
  § 371 Date: Oct. 16, 1997
  § 102(e) Date: Oct. 16, 1997
[87] PCT Pub. No.: WO95/33383
  PCT Pub. Date: Dec. 14, 1995

[30] Foreign Application Priority Data

Jun. 9, 1994 [DE] Germany .............................. 44 20 127

[51] Int. Cl.$^6$ ........................................................ A23B 4/12
[52] U.S. Cl. ........................... 426/332; 426/641; 426/652
[58] Field of Search .................................... 426/652, 332, 426/641

[56] References Cited

U.S. PATENT DOCUMENTS 4,342,789  8/1982  Ueno et al. .............................. 426/266
4,381,316  4/1983  Brotsky et al. ......................... 426/265

*Primary Examiner*—David Lacey
*Assistant Examiner*—Drew Becker
*Attorney, Agent, or Firm*—John S. Child, Jr.; Dann Dorfman Herrell and Skillman

[57] ABSTRACT

The invention concerns an agent for enhancing the keeping quality of bodies of slaughtered animals, parts of bodies of slaughtered animals, and hamburger patties, a process for the use thereof, and bodies of slaughtered animals, parts of bodies of slaughtered animals, and hamburger patties which are preserved according to the process.

20 Claims, No Drawings

AGENT FOR INCREASING THE KEEPING QUALITY OF SLAUGHTERED-ANIMAL CARCASSES

The invention relates to an agent for enhancing the keeping quality (reducing the perishability) of slaughtered animal bodies and of parts of bodies of slaughtered animals and to a process for utilizing said agent.

The procedures employed by way of trial in some countries for many decades for reducing the surface germ contents in bodies of slaughtered animals and parts thereof were successful to only a restricted extent.

Said procedures caused the meat surface to undergo an irreversible discoloration and the meat to become firm as determinable upon eating. Bacteriological examinations revealed that a distinct reduction in germ number was determinable only in certain surface areas. Thus, these procedures proved to be mostly unsuitable for further processing and final consumption. Absolutely open remained the question of a selective growth promotion of groups of acid-tolerant germs. Moreover, an exclusive use of organic edible acids resulted in an excessive acidulation of the meat, i.e., said acids accumulate as residues on the meat surface. The processes hitherto used have been based alone on the use of mixtures of organic edible acids or of halogens for spraying or immersing in drinking water. Since the processes mentioned suffer from the hygienic and substantial drawbacks as shown, there is an urgent demand for novel products and/or processes, respectively.

The processes hitherto used alone resort to the use of mixtures or organic edible acids or of halogens for spraying or immersing in drinking water.

Hence, it is the object of the invention to provide an agent for treating slaughtered animals or parts of slaughtered animals which causes the perishability thereof to be reduced (the keeping quality thereof to be enhanced). Thereby it is intended to be ensured that the protein reserves of slaughtered animals are exploited to full advantage. The agent is to be biologically active and should not involve formation of any undesirable residues.

In addition, it is the object of the invention to provide a process for treating the bodies of slaughtered animals with this agent.

According to the present invention, said object is attained by:
an agent for enhancing the keeping quality of parts of bodies of slaughtered animals comprising an aqueous solution of
  a. from 0.1 to 5.0% by weight of a stock composition of active ingredients which comprises, as constituents, at least one sugar, at least one inorganic phosphate, at least one compound selected from ascorbic acid or isoascorbic acid and the inorganic salts thereof; and
  b. from 0.1 to 5.0% by weight of an activator selected from acetic, lactic, adipic and fumaric acids,
each relative to the total amount of the aqueous solution.

As inorganic salts of the ascorbic acid and isoascorbic there are to be particularly mentioned the sodium, potassium and calcium salts.

The route of attaining the above object has originated on the recognition of a surface-active protection mechanism that has been furnished evidence of by investigation of slaughtered animals (cattle, swine) and of poultry after a superficial application of the solution for use. Moreover, further investigations on pieces and organs of slaughtered cattle and swine upon the application of the agent according to the invention showed a tendency for improving the keeping quality (reducing perishability) and of exsanguination.

The combination in the agent according to the invention of the stock composition of active ingredients with the activator causes a further significant improvement in the parameters tested.

It was not to be expected that the stock composition of active ingredients in combination with one or more activator (s) would be causative for the positive influence as described here on the surface of the slaughtered animal bodies or pieces thereof. However, quite surprisingly, the investigations showed an entirely new aspect of the application of both solutions in a cumative inhibition ("hurdle effect").

The improved keeping quality of slaughtered animal bodies is due to an interaction of the stock composition of active ingredients of the agent according to the invention with the microorganisms of the meat surface and the meat specific ingredients. This phenomenon may be explained by the inhibition of growth of microorganisms due to the so-called "intrinsic factor". This will be initiated by the pH reduction of the unbalanced sugar availability resulting in a reduction in the generation time of microorganisms including all effects caused thereby.

The discovery of this surface-active protection mechanism for inhibiting the microbial proliferation function constitutes a new important contribution to effectively controlling the keeping quality of slaughtered animal bodies and parts thereof. An improvement in the keeping quality of meat is of major importance for human nutrition and retention of health.

Said mechanism utilizes physiological processes. It is "biological". Its efficiency was proven in investigations conducted under economically relevant conditions.

It is particularly preferred that the agent according to the invention contains the stock composition of active ingredients in an amount of from 0.1 to 2.5 % by weight and the activator in an amount of from 0.1 to 2.5% by weight, each relative to the total amount of the aqueous solution.

Furthermore, conventional auxiliary materials and/or additives may be added to the agent according to the invention. These are added in amounts of up to 20% by weight, and preferably of up to 10% by weight. The auxiliary materials and/or additives, more particularly, include known water-soluble vegetable- or animal based swelling agents (thickening agents) (glued collagenous protein, animal gelatin, phophoproteids, caseins).

The sugars for the stock composition of active ingredients, more particularly, include mono- and oligosaccharides. Preferred are glucose (dextrose), galactose, mannose, fructose, arabinose, xylose, ribose, maltose, maltotriose, trehalose, sucrose, stachylose, raffinose, lactose or mixtures thereof. Particularly preferred is a mixture of dextrose, oligosaccharides, maltose and maltotriose.

The phosphates for the stock composition of active ingredients, more particularly, include alkali metal di- and polyphosphates. Preferred are alkali metal tripolyphosphate and, more specifically, its sodium salt, alkali metal polymetaphosphate, and especially its potassium salt, as well as tetraalkali metal diphosphate, and especially its potassium salt. Within the scope of the present invention, there are especially taken into consideration condensed sodium phosphates and/or condensed potassium phosphates, such as
sodium diphosphate, e.g., disodium dihydrogenphosphate, tetrasodium diphosphate;
sodium tripolyphosphate;

higher condensed sodium polyphosphates, e.g., sodium hexametaphosphate, hexasodium tetraphosphate (Graham's Salt);
tetrapotassium diphosphate;
potassium tripolyphosphate; and
Kurrol's Salt (high molecular weight potassium polyphosphate $(KPO_3)_n$).
Particularly preferred is a mixture of sodium tripolyphosphate, potassium polymetaphosphate and tetrapotassium diphosphate.

The stock composition of active ingredients may further contain acetoglycerides. These are monoacetyl and/or diacetyl glycerides based on animal or vegetable oils or fats.

The stock composition of active ingredients is characterized in that it is composed of from 40 to 70 parts by weight of sugar, from 15 to 35 parts by weight of organic phosphate, and from 0.5 to 10 parts by weight of the compound selected from ascorbic acid or isoascorbic acid or the inorganic salts thereof, citric acid, sorbic acid or mixtures thereof. The proportion of the monoacetyl glyceride and/or diacetyl glyceride is from 0.1 to 3 parts by weight.

Particularly preferred is a stock composition of active ingredients, the dissolved constituents of which are:
49.1 parts by weight of dextrose;
9.5 parts by weight of oligosaccharides;
5.1 parts by weight of maltose;
3.9 parts by weight of maltotriose;
23.0 parts by weight of sodium tripolyphosphate;
2.9 parts by weight of potassium polymetaphosphate;
2.9 parts by weight of tetrapotassium diphosphate;
2.5 parts by weight of ascorbic acid;
0.5 parts by weight of citric acid;
0.5 parts by weight of acetoglycerides.

As the activator within the scope of the invention, lactic acid is particularly preferred. The preparation of the agent according to the invention may be effected by dissolving the stock composition of active ingredients and the activator in water in such amounts that the desired concentrations will be obtained. It is, however, also possible to provide the stock composition of active ingredients and the activator as separate aqueous solutions which then—in order to produce the final ready-to-use application solution—are mixed in such amounts that the desired concentrations will be obtained. Auxiliary materials or additives, if necessary, may then optionally be admixed with the solution comprising the stock composition of active ingredients and the activator.

The resulting aqueous solution may now be used for the post-mortal treatment of the slaughtered animal bodies or parts thereof. To this end, the bodies or body parts are completely or partially sprayed with the solution or fully or partially immersed in the solution (dipped). The solution may also be intravascularly injected into parts or pieces. The solution may also be converted into a gel by means of suitable additives and may be applied in such state onto the internal and/or external surface of the slaughtered animal bodies or parts thereof.

The agent according to the invention is particularly well suitable for increasing the keeping quality (reducing perishability) of bodies or body parts of monogastric animals, animals with cellulose digestion in the rumen and poultry and edible fish. The agent according to the invention, more specifically, will find practical use in the post-mortal treatment of cattle, calf, swine, lamb, chicken, rooster, duckling, turkey, game and edible fish. In addition, the agent according to the invention may also be employed for treating minced beef, veal, pork and poultry meat. More particularly, ground beef, veal and pork is widely used for the manufacture of "Hamburger patties". These are pre-fabricated on a large scale (seasoned, divided into portions) and then supplied to fast-food restaurants where they are finally processed for eating. It is understood that also here it is a reduced perishability that matters. To achieve this effect, minced meat or meat passed through a meat grinder are worked up into a paste with an appropriate amount of the agent according to the invention, or said agent is sprayed onto the surfaces of the completed pre-fabricated patties. Accordingly, the present invention also relates to slaughtered animal bodies or parts of bodies of slaughtered animals that are obtainable by means of the above-described post-mortal treatment of said bodies and body parts and further to such "Hamburger patties" thus treated with the agent according to the invention.

The enhancement of the keeping quality of slaughtered animal bodies and parts thereof by way of the application of the agent according to the invention amounts to some powers of ten of $CFU/cm^2$, CFU=colony forming unit(s)—a representation of the number of microorganisms present on a surface), as is shown hereinafter. At the same time there is, especially in the case of poultry, with respect to cooking operations, a definite improvement in the gustatory properties by an increase in the degree of browning and the deep-frying properties.

The following examples further illustrate the present invention, however, are not intended to limit same.

In the following Examples there was used a stock solution containing 1% by weight of a stock composition of active ingredients comprising:

EXAMPLES 49.1 parts by weight of dextrose;
9.5 parts by weight of oligosaccharides;
5.1 parts by weight of maltose;
3.9 parts by weight of maltotriose;
23.0 parts by weight of sodium tripolyphosphate;
2.9 parts by weight of potassium polymetaphosphate;
2.9 parts by weight of tetrapotassium diphosphate;
2.5 parts by weight of ascorbic acid (Vitamin C);
0.5 parts by weight of citric acid;
0.5 parts by weight of acetoglycerides.

To this stock solution there was added lactic acid in various concentrations as specified below. The water used was drinking water.

The color evaluation of the color values L, a and b was carried out using a Chromameter (company Minolta) before the treatment (0 value=zero value), after the treatment on the same day (day 1) and on the 2nd and 3rd days.

The pH value was measured using a pH-Meter "PHK 21" (company NWK) equipped with a particular single rod multidiaphragm glass electrode of the Musculus longissimus dorsi and of the Musculus pectoralis profundus at the times already mentioned.

TABLE 1

Investigations of swine musculature without application and after spray application of an application solution containing 1% by weight of the stock composition of active ingredients and 2% by weight of lactic acid.

|  |  | Investigation of the color | Investigation of the pH value |
|---|---|---|---|
| Muscle cutting faces | M. subclavius | x |  |
|  | M teres major | x |  |

TABLE 1-continued

Investigations of swine musculature without application and after spray application of an application solution containing 1% by weight of the stock composition of active ingredients and 2% by weight of lactic acid.

|  |  | Investigation of the color | Investigation of the pH value |
|---|---|---|---|
|  | M lonissiumus dorsi | x | x |
|  | M pectoralis profundus | x | x |
| Muscles covered with fasciae | M supraspinatus | x |  |
|  | M subscapularis | x |  |
| Fatty tissue and connective tissue |  | x |  |

Investigation of pork pieces after spray application of the application solution In a first test series, an application solution made from the stock solution by addition of 2% by weight of lactic acid was applied to swine shoulders. Investigated were the effects caused by the spray treatment on the color and pH value of swine musculature.

The spray solution (SL) consisted of a stock solution containing 2% by weight of lactic acid. The color and the pH value were examined before the treatment and until the third day after the treatment. The color values L, a and b were determined of muscle cutting faces, muscles covered with fasciae and fatty tissue and connective tissue. For the investigation, suitable swine shoulders were cooled to a core temperature of +7° C. The spray solution (SL) was prepared with tap water; the pH value of SL was from 2.7 to 2.8. The swine shoulders (n=30) of the SL test group were sprayed by using a spraying device at a pressure of 0.8 bar for 30 seconds. The remaining swine shoulders (control group; n=30) were sprayed with tap water in the same manner. The swine shoulders were stored, packaged in plastic bags, at temperatures of from +2° C. to +4° C.

Results

During storage, blood flowed from the auxiliary vessels of the control and stained the surrounding connective tissue and fatty tissue. Of the treated shoulders, however, blood residues remained largely restricted to the locations where they had been before the treatment and, thus, the surrounding tissue remained brighter.

The muscle cutting faces exhibited color brightness values (L values) of between 40 and 5. In consideration of the color prior to the treatment, an increase in the L values, i.e. brightening, was observed after spraying the solution onto the shoulders. In the controls, a decrease in the L values was to be observed in nearly all of the cases (Table 2). Brightening of the treated parts was mostly accompanied by a decrease in colorfulness. The a value, as a criterion for the intensity of the red portions, decreased while it increased in the controls. In the controls there was further observable a greater rise in the b values (yellow portion) than that observed of the treated animals Table 2).

The L values of the muscles covered with fasciae were around 60 and, hence higher than those of the muscle cutting faces. The L, a and b values substantially changed in a manner similar to that of the muscle cutting faces, with differences occurring between the two muscles investigated. In contrast to most of the muscle cutting faces, on the 2nd and 3rd days the muscles covered with fasciae of the treated parts showed a higher rise in the b values (yellow portion) than that observed of the controls (Table 2).

The fatty tissue and connective tissue had the highest L values (around 70). It darkened during storage. This effect was higher in the controls than in the test group (Table 2).

The pH value of the test pieces before the treatment as well as of the pre-determined control pieces had an average value of 5.6 on M. pectoralis profundus and of 5.7 on M. longissimus dorsi. Due to spraying there was a significant pH drop by 0.43 and 0.48 pH units, respectively, on the first day. On the second day, the difference over the control group, amounting to 0.17 units on M. longissimus dorsi was still significant.

TABLE 2

Difference in the L, a and b color values of swine shoulders after spraying with the application solution (test group) and with water (controls).

|  |  | L | | | a | | | b | | |
|---|---|---|---|---|---|---|---|---|---|---|
|  |  | Day 1 | Day 2 | Day 3 | Day 1 | Day 2 | Day 3 | Day 1 | Day 2 | Day 3 |
| Muscle cutting faces | M. Subclavius | 0.37 | 1.22 | 0.41 | −2.61 | −3.18* | −2.43* | −1.90 | −2.92 | −1.07 |
|  | M. teres major | 4.45 | 5.73 | 6.07* | −2.49 | −3.49 | −2.25 | −4.18* | −3.09 | −2.76 |
|  | M. longissimus dorsi | 2.08 | 1.93 | 4.62 | −2.65 | −1.22 | −1.08 | −1.86 | −1.27 | −0.58 |
|  | M. pectoralis prof. | 1.29 | 2.71 | 2.62 | 2.10* | 0.35 | 1.48 | 0.67 | 0.69 | 0.86 |
| Muscles plus fasciae | M. supraspinatus | −0.47 | 3.38 | 0.07 | 0.60 | 1.20 | 1.48 | 0.16 | 3.78 | 2.99 |
|  | M. subscapularis | 2.46 | 1.32 | 0.35 | −0.01 | −1.00 | 0.58 | −0.21 | 0.05 | 0.72 |
| Fatty tissue and connective tissue |  | 1.53 | 2.11 | 3.47 | 2.67 | −4.37 | −7.64* | −1.74 | 0.78 | −1.53 |

[1]Difference between the change of the test group over the 0 value and of the control group over the 0 value:
(Treated$_{Day\ x}$ − Treated$_{0\ value}$) − (Control$_{Day\ x}$ − Control$_{0\ value}$)
*significant (probability of error) ($p < 0.05$)

When the swine shoulders were sprayed with a solution comprising the stock solution and 2% by weight of lactic acid, there was a reduction in the pH value on the meat surface, due to the low pH value of the spray solution. This is to be considered as beneficial with view to a possible reduction in the surface germ concentration. The reduced exundation of blood residues onto the meat surface is also attributed to the application of SL having a low pH value. Apart from a more appealing appearance of the treated part, this is also advantageous under a microbiological aspect, since blood constitutes a favorable nutrient medium for germs.

TABLE 3

Differences in the pH value between the test group and the control group after spraying with the stock solution containing 1% by weight of lactic acid and with water, respectively.

| | Difference (Test group − Controls) | |
|---|---|---|
| Day | M. Longissimus dorsi | M. pectoralis prof. |
| 1 | −0.48* | −0.43* |
| 2 | −0.17* | −0.13 |
| 3 | −0.08* | −0.03 |

*significant ($p > 0.05$)

Investigations of chickens ("broilers") after spray application of the application solution.

1. Test Procedure

In a second test series, the use of two surface treatment methods was tested with broilers. The broilers were subjected to either a spray treatment or a dip treatment. Nevertheless, the treatment may also be effected by intravascular injection. The starting material for the spray solution (SL), dip solution (DL) and injection solution (IL) was the application solution as described.

The dip and spray solutions were subjected to microbiological examinations before and after the treatment of the animals.

The test material consisted of 56 broilers in 2 test sections; i.e., 36 animals were DL-treated or SL-treated (treated animals), while 20 animals were dipped in or sprayed with water. In the dip method, the carcass was immersed in the solution; in the spray method, both the outer and inner body surfaces of the broilers were treated.

The temperature, color, pH value, and water content were measured and microbiological, sensorial and histological examinations were carried out on the days indicated in Table 4.

TABLE 4

Examinations of "broilers" after treatment of the skin surfaces with the stock solution containing 1% by weight of lactic acid.

| | Day of Examination | | | |
|---|---|---|---|---|
| Examination | 1 | 2 | 4 | 8 |
| Temperature | x | x | x | x |
| color | x | x | x | x |
| pH value | x | x | x | x |
| MFF | x | | | x |
| Sensorial | | x | | x |
| Microbiological | x | | | x |
| Histological | x | | | x |

2. Sample Material and Methods

The broilers were supplied by a poultry raiser and slaughterer. The animals were kept on ground. The slaughtering age was 7 weeks, the animal weight then was 1.3 to 2.2 kg. Comparability in weight was observed when the animals were assigned to the various test groups.

Solutions, Treatment of Animal Bodies, Storage, Disinfection

The spray solution (SL) consisted of stock solution plus 1% by weight of lactic acid. The dip solution (DS) was the stock solution containing lactic acid added in an amount of 0.2% by weight. The lactic acid concentration in DL was reduced because of the period of action of dipping extended over the action upon spraying, in order to avoid brightening of the carcasses.

Spraying was effected with a spraying device. The spray pressure was 0.8 bar, the flow rate was 6 l/min, and the period of spraying was 30 s. Dipping was carried out in 40 l of liquid per group of a maximum of 5 animals for 30 min.

The animals were stored in (sterile) plastic bags in a refrigerator at air temperature of +2° C max. until the 8th day.

Chemical Determination of Water Content in Fat Free Base

In order to determine the water content in fat free base (MFF), the skin of the left leg was examined on the 1st day, and the skin of the right leg was examined on the 8th day. The water content was determined according to L06.00-3 of the Amtliche Sammlung von Untersuchungsverfahren nach § 35 LMBG (Official Collection of Examination Procedures according to Section 35 LMBG). The fat content was determined by means of dichloromethane as extractant according to L06.00-6.

Biophysical Examinations

The temperature was subcutaneously and intramuscularly measured in the region of the breast skin and in the breast musculature and intramuscularly (breast musculature) during the storage period.

The color was measured at 5 sites: on the thorcial skin of the left half of the body, on the abdominal wall of the right half of the body, on the dorsal skin before the base of the right wing, on the dorsal skin above the left leg and on the left lower leg.

The pH value of the skin and musculature was determined in 4 regions: on the right and left sides of the chest and behind the wishbone (skin only) and left thigh musculature, respectively.

Sensorial Examination

For the sensorial examination, the broilers were deep fried in pairs at +140° C. The preparation time was 30 to 40 minutes.

Microbiological Examination

For the determination of the germ contents of the outer and inner body surfaces, 20 cm² of each of the leg and chest skin and 20 cm² of serosa in the abdominal wall and cloacal area were taken. The leg and chest skin was processed as a pool sample; the same was applicable to sampling for Salmonellae accumulation.

The quantitative determination of germs pertained to the total number of aerobic mesophilic germs L06.00-19 of the Amtliche Sammlung von Untersuchungsverfahren nach § 35 LMBG (Official Collection of Examination Procedures according to Section 35 LMBG). Enterobacteriaceae (L06.00-25) and Staphylococci as well as *St. aureus*, (Baird Parker Agar, serological confirmation of *St. aureus* with Staphyliside® BioMerieux).

For the detection of Salmonellae, the media prescribed in L06.00-20 of the Amtliche Sammlung von Untersuchungsverfahren nach §35 LMBG (Official Collection of Examination Procedures according to Section 35 LMBG) were used. The swabs were made on BPLS and MLCB-agar. A Salmonella test serum (Omnivalent, Behring) and a miniaturized set of test instruments (Enterotube®, Hoffmann-LaRoche) were used.

Histological Examination

The histological examination comprised the tissues of the outer and inner body surface (skin and serosa, respectively) and the underlying musculature. Samples were taken from the lower leg (skin with musculature) and from the abdominal wall (skin—musculature—serosa).

3. Results

3.1 Dip and Spray Solutions

The pH value of the dip solution was 5.1 and 5.2, respectively. The higher lactic acid concentration in the spray solution resulted in pH values of 3.0 and 3.1. The temperature of the solution during the application was from 13.7° C. to 15.4° C. The maximum germ contents of the initial solutions were $4.5 \times 10^1$ CFU/ml.

3.2 Water Content of Fat Free Base (MFF)

On the first day, the water content on fat free base in all test groups was between 84.8 and 85.8% (average value). on the 8th day, the MFF value was 81.0 to 81.9%. There were no significant differences between controls and treated animals (Tables 5, 6). The MFF values of the dipped animals were slightly higher than those of the sprayed broilers.

3.3. Biophysical Parameters a) Temperature of the Broilers

Prior to the treatment, the broilers exhibited average temperatures of +21.4° C. beneath the skin and +22.7° C. in the breast musculature. After the treatment, the average values were 17.0° C. and −17.1° C. The sprayed broilers were a little warmer than the animals which were treated by the dipping method. During storage, the core temperature (average values) measured on various days was between +2.2° C. and +5.0° C.

b) pH Value

The surface treatments with DL and SL resulted in a pH reduction of the skin on the first two days; however, the magnitude thereof, 0.76 pH units, was considerable only for the sprayed animals on the 1st day. In the second half of the storage period, the pH value of the treated animal mostly was slightly, while not significantly, higher than that of the control animals. The same is applicable to the pH value of the musculature throughout the entire duration of the tests (Tables 5, 6).

c) Color

There were no significant differences in the colors between the treated animals and the control animals in the L, a and b values.

d) Weight Loss upon Deep Frying

The treated animals, when deep fried, lost somewhat less of weight than the control animals did. Upon the application of water and solution, respectively, the control animals exhibited a weight loss of by 4.3% more than that of the treated animals (32.3% over 28.0%). After the application of the spray method, the difference was minimal (30.4% and 29.9% respectively).

3.4 Sensorial Examination

The animals treated with DL as well as with SL exhibited a higher degree of browning of the skin than the control animals. In part, the distinctly brighter color of the skin resulted in an assessment as a quality defect. Lesser browning of these animals was accompanied by a softer and less crisp skin consistency (Table 7). The meat of the control animals was rated to be tougher, more stringy or more like glue, especially on the 8th day (Table 7).

The broilers from the spray method, after storage up to the 8th day, had an unpleasant odor. This odor was ammoniacal in the controls and sweetish-beginning to rot in one of the treated animals.

3.5 Microbiological Examination

The aerobic mesophilic germ contents of the broiler on the 1st day varied within all of the test groups from $3.3 \times 10^3$ to $1.3 \times 10^4$ CFU/cm². The Enterobacteriaceae and Staphylococci counts mostly were about $10^2$ CFU/cm².

On the 8th day, the total number of aerobic germs within the groups was subject to fluctuations between $8.5 \times 10^6$ and $1.8 \times 10^8$ CFU/cm². In contrast, the group of the SL-sprayed animals exhibited uniformly low germ contents of from 1.4 to $6.0 \times 10^6$ CFU/cm². The number of Enterobacteriaceae on the 8th day of the dipped broilers was the highest, amounting to from $10^5$ to $10^6$ CFU/cm². In the controls it varied between $10^2$ to $10^6$ CFU/cm². In the SL-sprayed animals, a maximum Enterobacteriaceae count of $10^5$ CFU/cm2 was determined; most of the animals only showed $10^3$ CFU/cm². A similar gradient existed for the Staphylococci counts of the various groups, with the highest germ number being $2.3 \times 10^5$ CFU/cm².

Monitoring the germ contents over the entire period showed that a decrease in the germ content was to be noted; however, more particularly, the proportions of the germs within the total counts remained equal. Thus, there was no "sequestering" of the original germ counts by both of the treatment methods.

3.6 Histology

The skin, including the underlying musculature, did not show any significant deviations in morphology within the two days of examination (1st, 8th days), both after pretreatment with the dip solution (DL) containing 0.2% by weight of lactic acid and after spray treatment with the solution (SL) enriched with 1% by weight of lactic acid in comparison to what was found for the control animals.

By histological examination it could be determined that, however, the pre-treatments with both DL and SL, respectively, resulted on a morphologically recognizable densification of the outer skin and serosa cover areas, which made a premature and undesirable escape of interstitial liquid more difficult. An epidermal protective layer was absent in most of the cases, due to the mechanical pre-treatment of the slaughtered animal bodies in the test and control groups.

The application of solutions prepared from the 1% by weight stock solution by the addition of lactic acid by way of the spray or dip method resulted in a higher degree of browning of the broilers upon preparation. This fact as well as the toughness determined in several cases of the control animals were decisive for giving preference to the treated animals over the control animals.

From the microbiological point of view, the dip method proved to be less beneficial than the spray method. While the SL-sprayed animals after storage showed lesser germ infestation than the control animals, in the DL-treated animals a greater augmentation of Enterobacteriaceae and Staphylococci occurred than did in control animals. In the dip solution the germ content increased by the treatment, and a lactic acid concentration of 0.2% by weight did not provide any noticeable germ-reducing success, whereas the lactic acid concentration of 1% by weight in the spray solution is responsible for the lower germ infestation of these animals. An increase in the spray solution of the lactic acid concentration to further enhance the germ-reducing effect is not advisable because of changes in taste.

TABLE 5

Difference between the broilers treated with spray solution and the control animals in color, pH value and water contents fat free base (MMF). Differences (Treated Animals − Control)

|  | 1st Day | 2nd Day | 4th Day | 8th Day |
|---|---|---|---|---|
| Color |  |  |  |  |
| L | −0.85 | −0.52 | −0.15 | −1.95 |
| a | +0.55 | +0.72 | +0.57 | +0.58 |
| b | +0.33 | +0.28 | +0.98 | −0.09 |
| Skin | −0.76* | −0.08 | +0.09 | +0.18 |
| Chest Musculature | +0.20 | +0.18 | +0.07 | +0.01 |
| MFF (%) | +0.2 |  |  | +0.9 |

*significant ($p < 0.05$)

TABLE 6

Difference between the broiler treated with dip solution and the control animals in color, pH value and water contents fat free base (MFF). Differences (Treated Animals − Control)

|  | 1st Day | 2nd Day | 4th Day | 8th Day |
|---|---|---|---|---|
| Color |  |  |  |  |
| L | −0.95 | −1.88 | −1.78 | −2.31 |
| a | −0.09 | +0.24 | +0.33 | +0.33 |
| b | +0.32 | −0.49 | −0.31 | +0.26 |
| Skin | −0.17* | −0.04 | +0.05 | −0.05 |
| Chest Musculature | +0.01 | +0.08 | +0.02 | +0.04 |
| MFF (%) | +0.4 |  |  | −0.4 |

*significant ($p < 0.05$)

TABLE 7

Sensorial Examination of Deep Fried Broilers

| | Dipping | | | | Spraying | | | |
|---|---|---|---|---|---|---|---|---|
| | 2nd Day | | 8th Day | | 2nd Day | | 8th Day | |
| | K | B | K | B | K | B | K | B |
| Skin color brighter | ++ |  | ++ |  | + |  | +M |  |
| Skin Consistency softer | + |  | + |  | + |  | + |  |
| Meat Color |  |  |  |  |  |  |  |  |
| bright graying | + |  |  | + |  |  |  | +M |
| Meat Consistency Tough, stringy, glue-like |  |  | + |  | + |  | + |  |
| Odor and Taste |  |  |  |  |  |  |  |  |
| strange ammoniacal |  | + |  |  |  |  |  | +M |
| sweetish, beginning to rot |  |  |  |  |  |  |  | +M |
| Preference | — | 75% | — | 80% | 5.3% | 73.3% | 35.7% | — |

K: Control (dipped/sprayed with water)
B: Treated with dip/spray solution
M: At the same time assessed as defect Investigation of ducklings after spray application of the application solution 1. Test Procedure In a third test series, the outer and inner body surfaces of ducklings were treated by the spray method. As in the above case of the treatment of broilers, lactic acid was added to the spray solution. The spray solution was subjected to microbiological examinations before and after the treatment of the animals.

The test material consisted of 40 ducklings in 2 test sections; i.e., 20 animals were SL-treated (treated animals), while 20 control animals were sprayed with water.

The temperature, color, pH value, and water content were measured and microbiological, sensorial and histological examinations were carried out on the days indicated in Table 8.

TABLE 8

Examinations of ducklings after treatment of the skin surfaces with the stock solution containing 1% by weight of lactic acid.

| Examination | Number Animals/Group (n) | Day of Examination | | | |
|---|---|---|---|---|---|
|  |  | 1 | 2 | 4 | 8 |
| Temperature | 6 | x | x | x | x |
| Color | 6 | x | x | x | x |
| pH Value | 6 | x | x | x | x |
| MFF | 6 | x |  |  | x |
| Sensorial | 4 |  | x |  | x |
| Microbiological | 6 | x |  |  | x |
| Histological | 6 | x |  |  | x |

2. Sample Material and Methods

The ducklings were supplied by a poultry slaughterer. The animals were flying ducks at a slaughtering weight of between 1.4 and 2.1 kg. Comparability in weight was observed when the animals were assigned to the various test groups.

Solutions, Treatment of Animal Bodies, Storage, Disinfection

The spray solution (SL) consisted of the 1% by weight stock solution containing 1% by weight of lactic acid.

Spraying was effected with a spraying device. The spray pressure was 0.8 bar, the flow rate was 6 1/min, and the period of spraying was 30 s.

The animals were stored in (sterile) plastic bags in a refrigerator at air temperature of +4° C. max. until the 8th day.

The chemical determination of the water contents fat free base (MFF), biophysical and histological examinations were carried out in the same manner as those of the broilers.

For the sensorial examination, the ducklings were deep fried in pairs at 140° C. The preparation time was 40 minutes. The examination represented a test for differences between pairs. Additionally, it was decided whether individual features would have to be assessed as defects in quality. Upon the determination of differences or defects, the degrees thereof were rated as "low" (1), "moderate" (2) or "high" (3). For standardization purposes the testers were provided with an appropriate test scheme.

The total evaluation in Table 10 includes features, where the calculation of the average value had a result of at least 0.5; i.e., that the low rating of a feature had been given by at least half of the testers.

For the determination of the germ content of the outer and inner body surface, 50 g of leg and chest skin as well as serosa in the abdominal wall and cloacal area were taken and were processed as a pool sample; the same was applicable to sampling for Samonellae accumulation.

The method and media for detecting the total number of aerobic mesophilic germs, of Enterobacteriaceae and of Staphylococci and *St. aureus* as well as of Samonellae correspond to the procedures as described for broilers.

3. Results

3.1 Spray Solutions

The pH value of the spray solution was 2.97 and 3.06, respectively.

The maximum germ contents of the solutions before and after the treatment of the ducklings were $4.8 \times 10^1$ CFU/ml. *E. coli,* coliform germs, *Pseudomonas aeruginosa* and Enterococci were not detectable in 100 ml, and sulfite-reducing spore-forming anaerobica were not detectable in 20 ml.

3.2 Water Contents Fat free Base (MFF)

With respect to the water content on fat free base (MFF), the pH value of the skin and in the musculature, the L, a and b values (Table 9), the weight loss upon deep frying, and the sensorial quality (Table 10), the treated animals were equivalent to the control animals.

3.3 Microbiological Examination

The aerobic mesophilic germ contents of the ducklings on the 1st day varied within all of the test groups from $2.2 \times 10^4$ to $1.2 \times 10^6$ CFU/g. The Enterobacteriaceae and Staphylococci counts were between $1.9 \times 10^2$ and $8.1 \times 10^4$ CFU/g. The average variation of the germ contents between the two groups was less than half a power of ten On the 8th day, the total number of aerobic germs of the control group was between $1.0 \times 10^7$ and $1.0 \times 10^9$ CFU/g. The group of the SL-sprayed animals exhibited lower germ contents of from $5.2 \times 10^5$ to $4.3 \times 10^8$ CFU/g. The number of Enterobacteriaceae on the 8th day in the controls varied between $2.1 \times 10^4$ and $2.8 \times 10^7$ CFU/g while in the sprayed animals it was between $3.8 \times 10^3$ and $4.1 \times 10^8$ CFU/g. Thus, on the average, the total germ number as well as the number of Enterobacteriaceae was lower by one power of ten than that of the control group. In both groups, Staphylococci counts between $1.5 \times 10^3$ and $4.6 \times 10^5$ CFU/g were determined.

The ducklings of the first section exhibited a higher infestation with *Staphylococcus aureus* (up to $1.1 \times 10^4$ CFU/g) than the ducklings of the 2nd section ($2.0 \times 10^2$ CFU/g as maximum). The presence of Salomnellae in 50 g of skin was also detected only in the first section, i.e., in one animal each per group.

3.4 Histology

Upon histological inspection, the skin of the leg surface as well as that of the lateral abdominal wall of ducklings when sprayed with the 1% by weight stock solution containing 1% by weight of lactic acid showed only slight deviations in structure as compared with comparable control animals of the 1st day of the test. In contrast, structural changes were conspicuous in untreated ducklings after a storage period of 8 days.

Deeper layers of the skin and the hypoderm remained unaffected by the pre-treatment. Fat cells and musculature had changed in the same manner in both the test and control groups after 8 days of storage. The fat vacuoles appeared to have collapsed, the muscle fiber boundaries and the Endo- and/or Perimysium appeared to have peeled off.

Spraying the ducklings with the 1% by weight stock solution containing 1% by weight of lactic acid resulted in a distinct decrease in the pH value on the first day and, to a minor degree, on the second day as well. This effect was essentially more significant than in the case of the broilers. In spite of the low pH value there was no particularly enhanced sour odor or taste.

3.5 Sensorial Examination

The sensorial quality, in its total assessment, of the ducklings was to a small degree positively affected by the treatment. The majority of animals allowed an increased browning to be observed on the 8th day. In contrast to the broilers, this effect did not occur on the 1st day.

The surface germ content after 8 days of storage was reduced by the treatment. The surface germ contents of poultry will have to be subject of greater attention, since germs will more readily penetrate into meat due to skin damages caused by scalding and plucking, so that poultry, in comparison to other types of slaughtered animals, will exhibit relatively high germ contents under the skin surface.

SL-spraying of ducklings altogether results in an improved microbiological and sensorial assessment. The sensorial quality is affected to a lesser degree than that of broilers.

TABLE 9

Differences between ducklings treated with the spray solution and the control animals in color, pH value and water contents fat free base (MFF).

| | Differences (Treated Animals − Control) | | | |
|---|---|---|---|---|
| | 1st Day | 2nd Day | 4th Day | 8th Day |
| Color | | | | |
| L | −0.24 | −0.63 | −0.37 | −0.45 |
| a | +0.65 | −0.06 | −0.46 | +0.36 |
| b | +0.66 | +1.08 | +0.48 | +0.82 |

TABLE 9-continued

Differences between ducklings treated with the spray solution and the control animals in color, pH value and water contents fat free base (MFF).

| | Differences (Treated Animals − Control) | | | |
|---|---|---|---|---|
| | 1st Day | 2nd Day | 4th Day | 8th Day |
| ph value | | | | |
| Skin | −2.08* | −0.60* | −0.16 | −0.17 |
| Chest Musculature | 0.00 | +0.01 | +0.05 | −0.03 |
| MFF (%) | +1.2 | | | −0.3 |

*significant ($p < 0.05$)

TABLE 10

Sensorial Examination of Deep Fried Ducklings

| | 2nd Day | | 8th Day | |
|---|---|---|---|---|
| | K | B | K | B |
| Skin Color darker | | | | + |
| Odor and Taste fishy/oily | | M | | M |
| Preference | 17.1% | 37.1% | 18.2% | 30.3% |

K: Control (sprayed with water)
B: Treated with spray solution
M: Assessed as defect

What is claimed is:

1. An agent for preserving bodies of slaughtered animals comprising an aqueous solution of
   (a) from 0.1 to 5.0% by weight of a stock composition of active ingredients which comprises at least one sugar, at least one phosphate and at least one compound selected from the group consisting of ascorbic acid, isoascorbic acid, inorganic salts of ascorbic acid, inorganic salts of isoascorbic acid, citric acid, sorbic acid, and mixtures thereof; and
   (b) from 0.1 to 5.0% by weight of an activator consisting essentially of lactic acid, wherein the weight percents of the composition and the lactic acid are each relative to the total amount of aqueous solution.

2. The agent according to claim 1 wherein the phosphate is selected from the group consisting of alkali metal diphosphate, alkali metal polyphosphate, alkali metal tripolyphosphate, alkali metal polymetaphosphate, tetraalkali metal diphosphate, condensed sodium phosphate and condensed potassium phosphate.

3. The agent according to claim 1 wherein the phosphate is a mixture of sodium tripolyphosphate, potassium polymetaphosphate and tetrapotassium diphosphate.

4. The agent according to claim 1 wherein the stock composition further comprises at least one acetoglyceride.

5. The agent according to claim 1 further comprising at least one auxiliary material.

6. The agent according to claim 1 further comprising at least one additive.

7. The agent according to claim 1 comprising an aqueous solution of 0.1 to 2.5% by weight of the stock composition and 0.1 to 2.5% by weight of the activator.

8. The agent according to claim 1 wherein the sugar is selected from the group consisting of monosaccharide, oligosaccharide, glucose, galactose, mannose, fructose, arabinose, xylose, ribose, maltose, maltotriose, trehalose, sucrose, stachylose, raffinose, lactose and mixtures thereof.

9. The agent according to claim 1 wherein the stock composition comprises 40 to 70 parts by weight of sugar, 15 to 35 parts by weight of organic phosphate, 0.5 to 10 parts by weight of the compound selected from the group consisting of ascorbic acid, isoascorbic acid, inorganic salts of ascorbic acid, inorganic salts of isoascorbic acid, citric acid, sorbic acid, and mixtures thereof, and 0.1 to 3 parts by weight of acetoglyceride.

10. The agent according to claim 1 wherein the stock composition comprises:
49.1 parts by weight of dextrose;
9.5 parts by weight of oligosaccharides;
5.1 parts by weight of maltose;
3.9 parts by weight of maltotriose;
23.0 parts by weight of sodium tripolyphosphate;
2.9 parts by weight of potassium polymetaphosphate;
2.9 parts by weight of tetrapotassium diphosphate;
2.5 parts by weight of ascorbic acid;
0.5 parts by weight of citric acid; and
0.5 parts by weight of acetoglycerides.

11. A method for enhancing the keeping quality of a body part of a slaughtered animal comprising the step of postmortally applying an agent to the body part, wherein the agent comprises an aqueous solution of
   (a) from 0.1 to 5.0% by weight of a stock composition of active ingredients which comprises at least one sugar, at least one inorganic phosphate, at least one compound selected from the group consisting of ascorbic acid, isoascorbic acid, inorganic salts of ascorbic acid, inorganic salts of isoascorbic acid, citric acid, sorbic acid and mixtures thereof; and
   (b) from 0.1 to 5.0% by weight of an activator consisting essentially of lactic acid, wherein the weight percents of the composition and the lactic acid are each relative to the total amount of aqueous solution.

12. The method according to claim 11 wherein the step of applying agent to a body part comprises the step of applying the agent to a body part of an animal selected from the group consisting of a monogastric animal, an animal with cellulose digestion in the rumen, poultry, edible fish, minced beef, veal, pork, and poultry meat.

13. The method according to claim 11 wherein the step of postmortally applying an agent to the body part comprises the step of applying an agent comprising an aqueous solution of a stock composition of active ingredients comprising from 40 to 70 parts by weight of sugar, from 15 to 35 parts by weight of organic phosphate, from 0.5 to 10 parts by weight of a compound selected from the group consisting of ascorbic acid, isoascorbic acid, inorganic salts of ascorbic acid, inorganic salts of isoascorbic acid, citric acid, sorbic acid, and mixtures thereof, and 0.1 to 3 parts by weight of acetoglyceride.

14. The method according to claim 11 wherein the step of postmortally applying an agent to the body part comprises the step of applying an agent comprising an aqueous solution of a stock composition of active ingredients comprising:
49.1 parts by weight of dextrose;
9.5 parts by weight of oligosaccharides;
5.1 parts by weight of maltose;
3.9 parts by weight of maltotriose;
23.0 parts by weight of sodium tripolyphosphate;
2.9 parts by weight of potassium polymetaphosphate;
2.9 parts by weight of tetrapotassium diphosphate;
2.5 parts by weight of ascorbic acid;
0.5 parts by weight of citric acid; and
0.5 parts by weight of acetoglycerides.

15. A method for enhancing the keeping quality of a hamburger patty comprising the step of applying an agent to the hamburger patty, wherein the agent comprises an aqueous solution of
   (a) from 0.1 to 5.0% by weight of a stock composition of active ingredients which comprises at least one sugar, at least one inorganic phosphate, at least one compound selected from the group consisting of ascorbic acid, isoascorbic acid, the inorganic salts of ascorbic acid the inorganic salts of isoascorbic acid, citric acid, sorbic acid and mixtures thereof; and
   (b) from 0.1 to 5.0% by weight of an activator consisting essentially of lactic acid, wherein the weight percents of the composition and the lactic acid are each relative to the total amount of aqueous solution.

16. The method according to claim 15 wherein the step of applying an agent to the hamburger patty comprises the step of applying an agent comprising an aqueous solution of a stock composition of active ingredients comprising from 40 to 70 parts by weight of sugar, from 15 to 35 parts by weight of organic phosphate, from 0.5 to 10 parts by weight of a compound selected from the group consisting of ascorbic acid, isoascorbic acid, inorganic salts of ascorbic acid, inorganic salts of isoascorbic acid, citric acid, sorbic acid, and mixtures thereof and 0.1 to 3 parts by weight of acetoglyceride.

17. The method according to claim 15 wherein the step of applying an agent to the hamburger patty comprises the step of applying an agent comprising an aqueous solution of a stock composition of active ingredients comprising:
49.1 parts by weight of dextrose;
9.5 parts by weight of oligosaccharides;
5.1 parts by weight of maltose;
3.9 parts by weight of maltotriose;
23.0 parts by weight of sodium tripolyphosphate;
2.9 parts by weight of potassium polymetaphosphate;
2.9 parts by weight of tetrapotassium diphosphate;
2.5 parts by weight of ascorbic acid;
0.5 parts by weight of citric acid; and
0.5 parts by weight of acetoglycerides.

18. A method for enhancing the keeping quality of a meat selected from the group consisting of minced beef, veal, pork and poultry comprising the step of applying an agent to the meat, wherein the agent comprises an aqueous solution of:
   (a) from 0.1 to 5.0% by weight of a stock composition of active ingredient which comprises as constituents, at least one sugar, at least one inorganic phosphate, at least one compound selected from the group consisting of ascorbic acid, isoascorbic acid, inorganic salts of ascorbic acid, inorganic salts of isoascorbic acid, citric acid, sorbic acid and mixtures thereof; and
   (b) from 0.1 to 5.0% by weight of an activator consisting essentially of lactic acid, wherein the weight percents of the composition and the lactic acid are each relative to the total amount of aqueous solution.

19. The method according to claim 18 wherein the step of applying an agent to the meat comprises the step of applying an agent comprising an aqueous solution of a stock composition of active ingredients comprising from 40 to 70 parts by weight of sugar, from 15 to 35 parts by weight of organic phosphate, from 0.5 to 10 parts by weight of a compound selected from the group consisting of ascorbic acid, isoascorbic acid, inorganic salts of ascorbic acid, inorganic salts of isoascorbic acid, citric acid, sorbic acid, and mixtures thereof and 0.1 to 3 parts by weight of acetoglyceride.

20. The method according to claim 18 wherein the step of applying an agent to the meat comprises the step of applying an agent comprising an aqueous solution of a stock composition of active ingredients comprising;
49.1 parts by weight of dextrose;
9.5 parts by weight of oligosaccharides;
5.1 parts by weight of maltose;
3.9 parts by weight of maltotriose;
23.0 parts by weight of sodium tripolyphosphate;
2.9 parts by weight of potassium polymetaphosphate;
2.9 parts by weight of tetrapotassium diphosphate;
2.5 parts by weight of ascorbic acid;
0.5 parts by weight of citric acid; and
0.5 parts by weight of acetoglycerides.

\* \* \* \* \*

UNITED STATES PATENT AND TRADEMARK OFFICE
CERTIFICATE OF CORRECTION

PATENT NO. : 5,989,611
DATED : November 23, 1999
INVENTOR(S) : Stemmler, Jr. et al.

It is certified that error appears in the above-identified patent and that said Letters Patent is hereby corrected as shown below:

Column 3,
Line 16, change "organic" to -- inorganic --;

Column 15,
Line 36, insert "inorganic" before "phosphate";

Column 16,
Line 3, change "organic" to -- inorganic --;
Line 46, change "organic" to -- inorganic --;

Column 17,
Line 19, change "organic" to -- inorganic --; and

Column 18,
Line 19, change "organic" to -- inorganic --.

Signed and Sealed this

Twenty-second Day of January, 2002

Attest:

JAMES E. ROGAN
*Attesting Officer*  *Director of the United States Patent and Trademark Office*